United States Patent [19]

LeGrand et al.

[11] 4,198,498

[45] Apr. 15, 1980

[54] TRIS[POLY(ARYLOXYSILOXANE)] POLYMERS

[75] Inventors: Donald G. LeGrand, Burnt Hills, N.Y.; Gina G. Vitale, Arlington, Va.

[73] Assignee: General Electric Company, Pittsfield, Mass.

[21] Appl. No.: 962,613

[22] Filed: Nov. 21, 1978

[51] Int. Cl.$^2$ .............................................. C08G 77/26
[52] U.S. Cl. ........................................ 528/38; 528/29; 528/34; 528/43
[58] Field of Search ....................... 528/29, 34, 38, 43

[56] References Cited

U.S. PATENT DOCUMENTS 3,668,273  6/1972  Krantz ................................... 528/29

Primary Examiner—Melvyn I. Marquis
Attorney, Agent, or Firm—Myron B. Kapustij; William F. Mufatti

[57] ABSTRACT

The present invention relates to novel tris[poly(aryloxysiloxane)] polymers and to a method for preparing them.

9 Claims, No Drawings

TRIS[POLY(ARYLOXYSILOXANE)] POLYMERS

This invention relates to tris[poly(aryloxysiloxane)] polymers which are the reaction products of trialkoxysilanes and dihydric phenol chain-stopped polydiorganosiloxanes.

DESCRIPTION OF THE INVENTION

The tris[poly(aryloxysilane)] polymers of the present invention are the reaction products of a trifunctional alkoxysilane, i.e., a trialkoxysilane, and a bifunctional aryloxysiloxane, preferably a dihydric phenol polydiorganosiloxane. These polymers are represented by the general formula

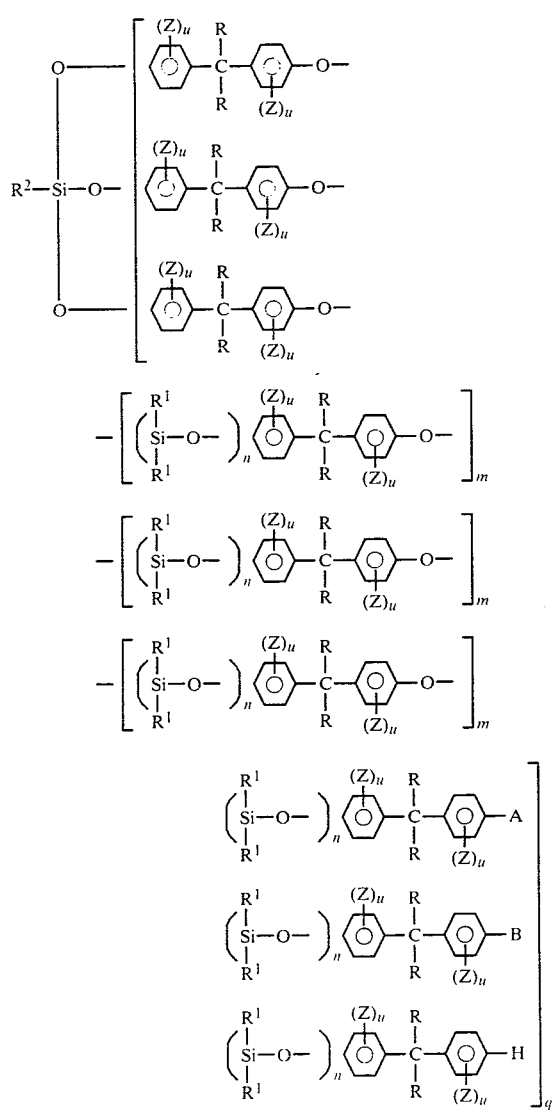

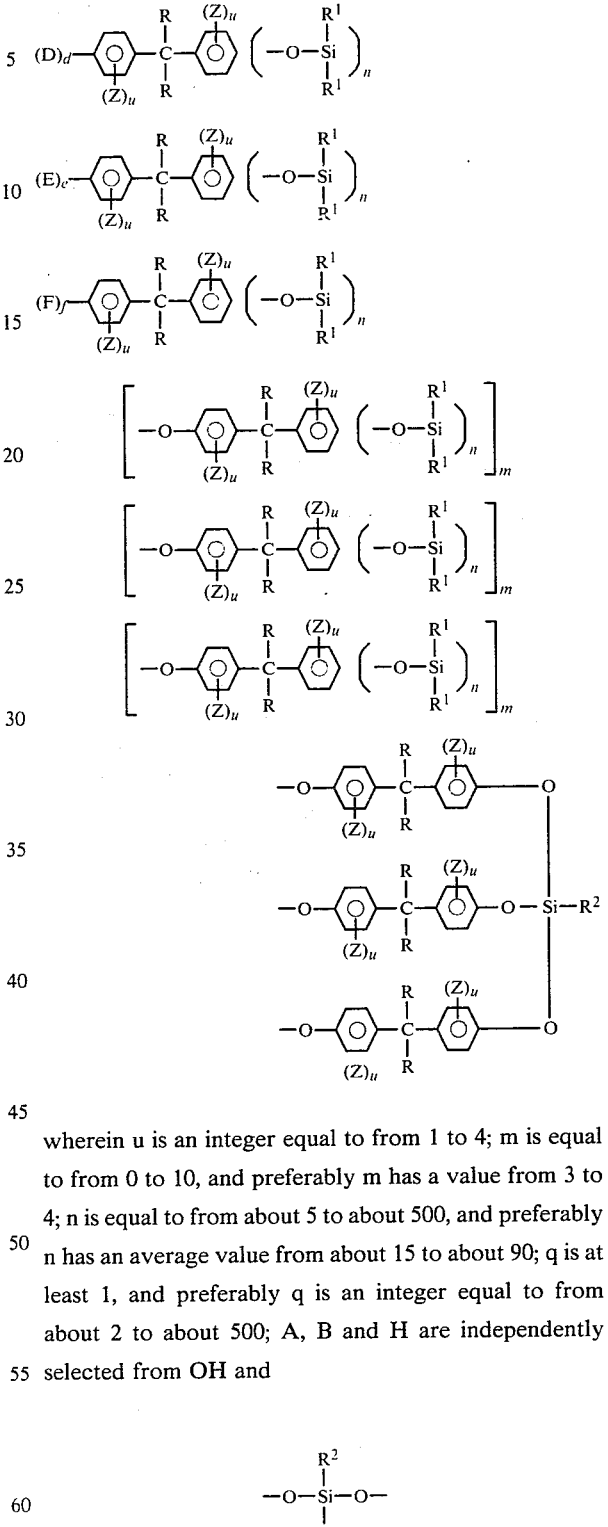

wherein u is an integer equal to from 1 to 4; m is equal to from 0 to 10, and preferably m has a value from 3 to 4; n is equal to from about 5 to about 500, and preferably n has an average value from about 15 to about 90; q is at least 1, and preferably q is an integer equal to from about 2 to about 500; A, B and H are independently selected from OH and $$-O-\underset{\underset{O}{|}}{\overset{\overset{R^2}{|}}{Si}}-O-$$

radicals; D, E and F are OH; d, e and f are 0 or 1, provided that if q is equal to 1, then d, e and f are all 0 and A, B and C are

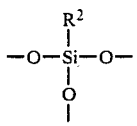

radicals, and further provided that if q is an integer greater than 1, then at least one of A, B and C is a

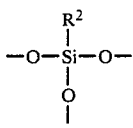

radical and the sum of d+e+f is equal to an integer Y having a value of from 0 to 2 obtained from the formula 3-W=Y wherein W is the number of

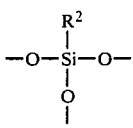

radicals represented by A, B and H; R is a member selected from the class of hydrogen, monovalent hydrocarbon radicals and halogenated monovalent hydrocarbon radicals; $R^1$ is a member selected from the class of monovalent hydrocarbon radicals, halogenated monovalent hydrocarbon radicals, and cyanoalkyl radicals; Z is a member selected from the class of hydrogen, lower alkyl radicals and halogen radicals; and $R^2$ is selected from the class of

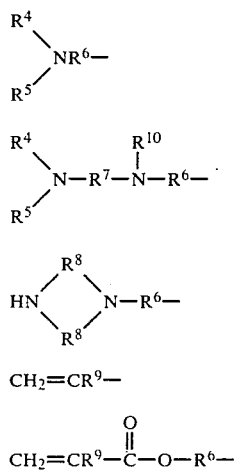

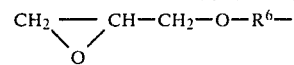

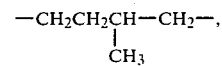

wherein $R^4$, $R^5$ and $R^{10}$ are independently selected from hydrogen and alkyl radicals, preferably alkyl radicals containing from 1 to about 10 carbon atoms, $R^6$ and $R^7$ are alkylidene radicals, preferably alkylidene radicals containing from 2 to about 8 carbon atoms, $R^8$ is a straight chain alkylidene radical containing from 2 to about 4 carbon atoms, and $R^9$ is a member selected from the class of hydrogen and methyl.

Included within the radicals represented by R of Formula I are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; R can be all the same radical or any two or more of the aformentioned radicals, while R is preferably methyl. $R^1$ includes all radicals included by R above except hydrogen, where $R^1$ also can be all the same radical or any two or more of the afore-mentioned R radicals except hydrogen, and $R^1$ is preferably methyl. $R^1$ also includes, in addition to all the radicals included by R, except hydrogen, cyanoalkyl radicals such as cyanoethyl, cyanobutyl, etc., radicals. Radicals that are included within the definition of Z of Formula I are hydrogen, methyl, ethyl, propyl, chloro, bromo, iodo, etc., and Z is preferably hydrogen.

Included within the alkylidene radicals represented by $R^6$ and $R^7$ are —CH₂CH₂—, —CH₂CH₂CH₂—, —CH₂CH—, —CHCH₂—, —CH₂CHCH₂—,
  |           |              |
  CH₃       CH₃            CH₃

—CH₂(CH₂)₂CH₂—, —CH₂(CH₂)₃CH₂—,

—CH₂CH₂CH—CH₂—,
        |
        CH₃ and the like.

Included within the straight chain alkylidene radicals represented by $R^8$ are —CH₂CH₂—, —CH₂CH₂CH₂—, and —CH₂(CH₂)₂CH₂— with —CH₂CH₂— being preferred. The compounds of Formula I are prepared by coreacting a trifunctional alkoxysilane represented by the general formula

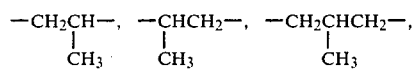

(II)

with a dihydric phenol chain-stopped polydiorganosiloxane having the formula:

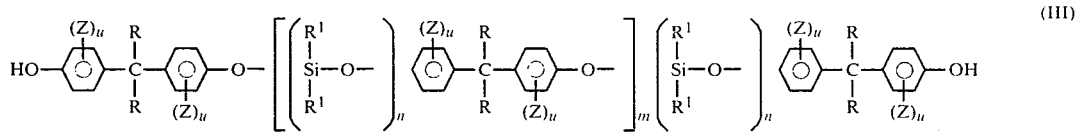

(III)

wherein R, $R^1$, $R^2$, m and n are as defined above, and $R^3$ is an alkyl radical containing from 1 to about 8 carbon atoms.

Examples of compounds of Formula II include gamma-aminopropyltriethoxy silane, gamma-aminopropyltrimethoxy silane, N-beta-(aminoethyl)gamma-aminopropyl triethoxy silane, gamma-methacryloxypropyltrimethoxy silane, and vinyl triethoxy silane.

The oligomers of Formula III can be produced by forming at temperatures in the range of 25° C. to 100° C., and in the presence of an acid acceptor, a mixture of halogenated chain-stopped polydiorganosiloxane having the formula:

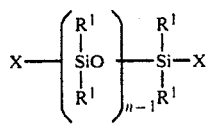
(IV)

and a dihydric phenol having the formula:

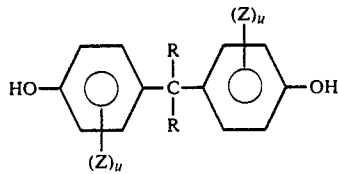
(V)

where R, $R^1$, Z, u, n are as defined above, and X is a halogen radical, preferably chloro.

The halogenated chain-stopped polydiorganosiloxanes of Formula IV hereinafter referred to as the "halogenated polysiloxane" can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 2,902,507. Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogenated polysiloxane are not critical, generally it has been found desirable to maintain the halogen content of the resulting halogenated polysiloxane in the range of about 0.4 to about 35 percent, by weight, and preferably from about 1 to about 5 percent by weight of said halogenated polysiloxane. The halogenated polysiloxane is preferably in the form of a chlorinated polydimethylsiloxane.

Dihydric phenols that are included in Formula V are, for example, 2,2-bis(4-hydroxyphenyl)-propane (bisphenol-A); 2,4'-dihydroxydiphenylmethane; bis(2-hydroxyphenyl)-methane; bis-(4-hydroxyphenyl)-methane; 1,1-bis-(4-hydroxyphenyl)-ethane; 1,2-bis(4-hydroxyphenyl)-ethane; 1,1-bis-(4-hydroxy-2-chlorophenyl)ethane; 1,1-bis-(2,5-dimethyl-4-hydroxyphenyl)-ethane; 1,3-bis(3-methyl-4-hydroxyphenyl)-propane; 2,2-bis-(3-isopropyl-4-hydroxyphenyl)-propane, etc.

In the practice of the invention, an anhydrous mixture of the halogenated polysiloxane of Formula IV and the polyhydric phenol of Formula V is formed in the presence of a base such as a tertiary amine, for example, pyridine, and at temperatures sufficient to effect reaction. The intermediate oligomer reaction product of Formula III produced is in the form of a polydiorganosiloxane that is chain-stopped by a substituted aryloxysilicon linkage with dihydric phenol radicals.

In the production of this intermediate oligomer reaction product, it has been found desirable to employ a suitable inert organic solvent in the reaction mixture to facilitate product formation. Suitable organic solvents include chlorobenzene, methylene chloride, etc., while any organic solvent that is inert to the reactants and sufficiently high in boiling point to achieve satisfactory results can be employed. In addition to serving as an acceptor for by-product acid, a tertiary amine can also be employed as a solvent for the reactants, if desired. Suitable tertiary amines include, for example, pyridine, quinoline, tributylamine, etc.

Although the order of addition of the reactants is not critical, it has been found expedient to add the halogenated polysiloxane to an organic solvent solution of the polyhydric phenol and the tertiary amine. Generally, proportions of the halogenated polysiloxane and dihydric phenol that can be employed to form the intermediate reaction product will vary in accordance with the properties desired in the final copolymer. Experience has shown that at least about 0.15 part to about 3 parts of the halogenated polysiloxane, per part of dihydric phenol, can be employed to achieve satisfactory results. The proportions of tertiary amine that are utilized should be at least sufficient to remove all of the by-product acid formed which will vary in accordance with the proportions of the reactsnts employed.

Temperatures in the range of 25° C. to 100° C. can be employed during the formation of the intermediate reaction product while a preferred range is 25° C. to 75° C.

The intermediate oligomer reaction product thus formed, represented by Formula III, is then coreacted with the trifunctional alkoxysilane represented by Formula II to form the tris[poly(aryloxysiloxane] represented by Formula I. The reaction of the trifunctional alkoxysilane and the difunctional dihydric phenol chain-stopped polydiorganosiloxane is carried out under reaction conditions effective for said trifunctional alkoxysilane to coreact with the difunctional polydiorganosiloxane. Generally, the temperature required for these two reactants to coreact ranges from ambient to about 50° C. The reaction is preferably carried out in the presence of an inert organic solvent. Suitable organic solvents include hexane, chlorobenzene, methylene chloride, etc., while any organic solvent that is inert to the reactants and sufficiently high in boiling point to achieve satisfactory results can be employed.

The amount of reactants employed depends on the degree of branching and crosslinking desired in the polymer. The greater the degree of branching and, therefore, the lesser the degree of crosslinking desired in the polymer, the greater the amount of the difunctional polydiorganosiloxane oligomer is utilized in the reaction mixture. If more crosslinking and less branching in the polymer is desired, then more of the trifunctional silane is utilized in the reaction mixture.

Generally, if K is the number of moles of the oligomer of Formula III and L is the number of moles of the trialkoxysilane of Formula II, the ratio of K/L falls within the range of from 1.5 to 0.2. The higher this ratio, i.e., the closer the ratio gets to 1.5, the greater the degree of crosslinking of the polymers and, correspondingly, the lesser the degree of branching of the polymer. The lower this ratio, i.e., the closer the ratio gets to 0.2, the lesser the degree of crosslinking and, correspondingly, the greater the degree of branching of the polymer.

Some exemplary compounds represented by Formula I are set forth in Table I below. Compound 1 in Table I is one wherein q is equal to 1. Compound 2, which contains branching and crosslinking, is one wherein q is 2, B is a trifunctional

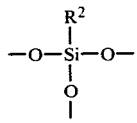

radical, A and H are OH radicals, D and F are OH radicals, d and f are 1, e is 0, W is 1, and Y is 2. Compound 3, which also contains branching and crosslinking, albeit less branching and more crosslinking than compound 2, is one wherein q is equal to 2, A and B are trifunctional

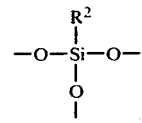

radicals, H is an OH radical, F is an OH radical, d and e are 0, f is 1, W is 2, and Y is 1. Compound 4, which contains no branching and only crosslinking, is one wherein q is equal to 2, A, B and H are trifunctional

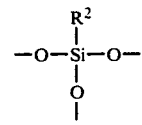

radicals, d, e and f are 0, W is 3, and Y is 0. Crosslinking occurs through Si—O—Si linkages, i.e., through the available oxygen linkage trifunctional silane.

TABLE I

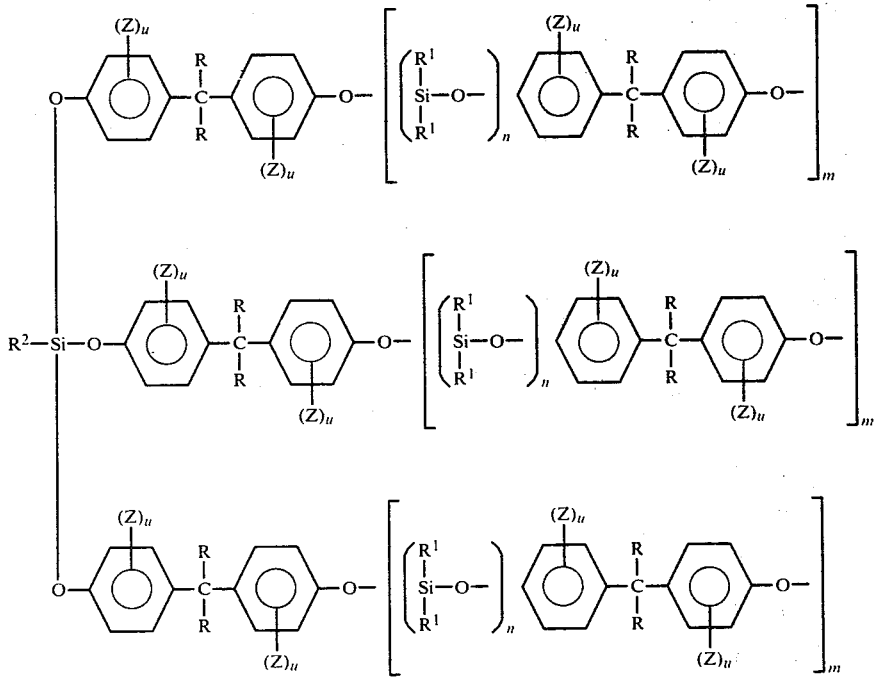

(1)

TABLE I-continued
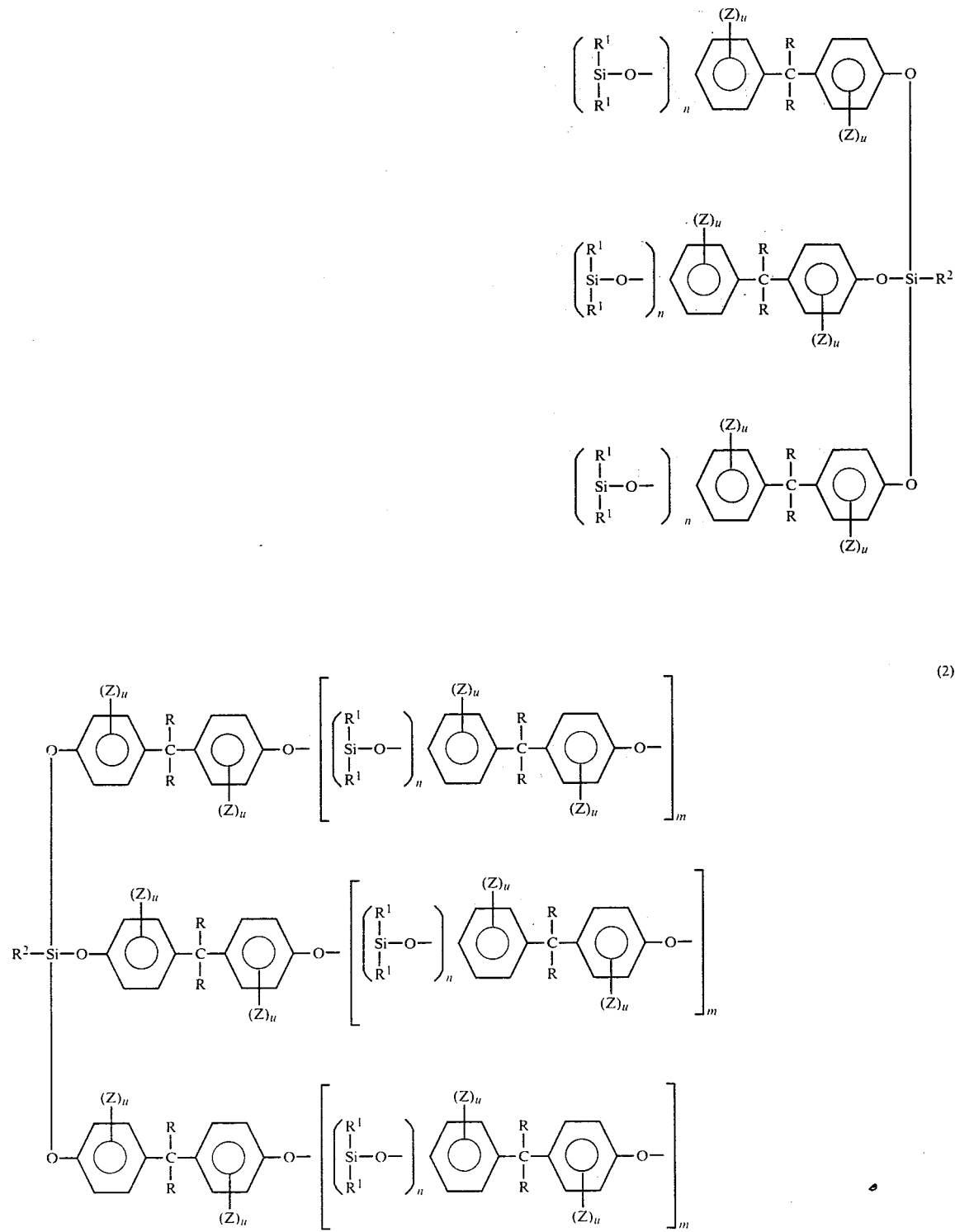

TABLE I-continued
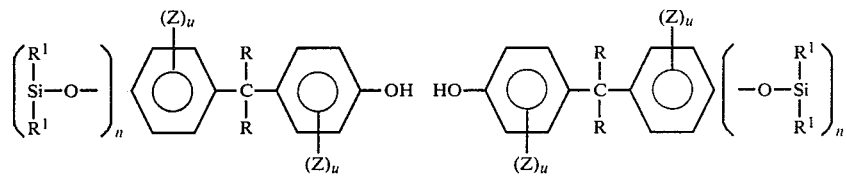
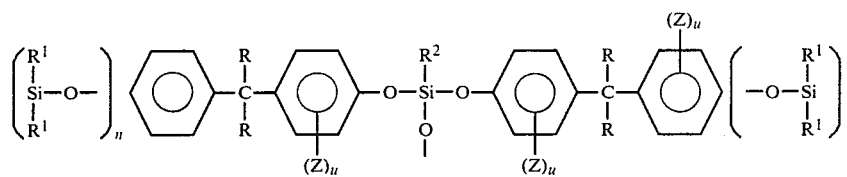
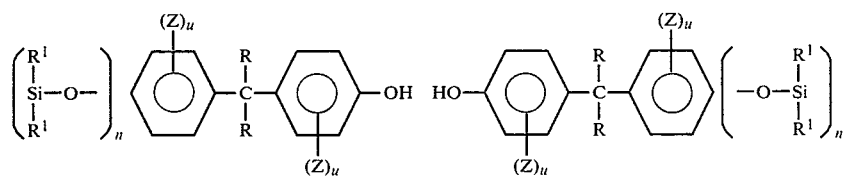
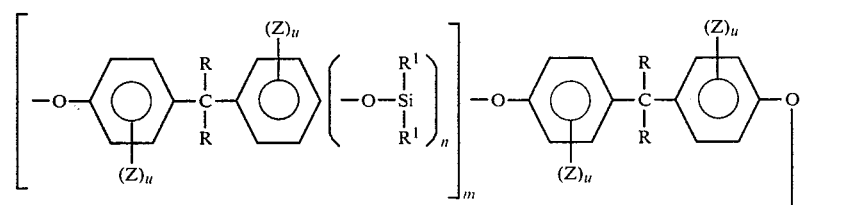
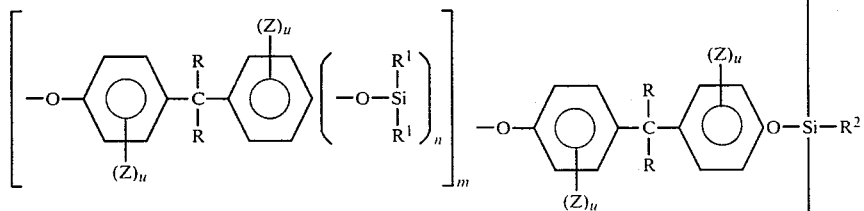
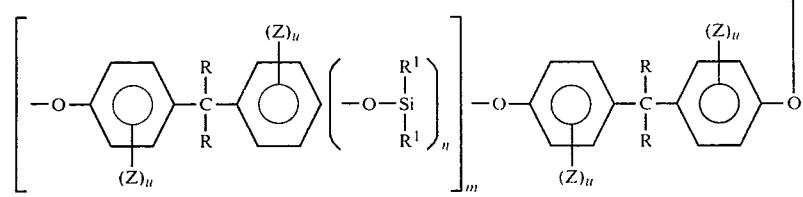

TABLE I-continued
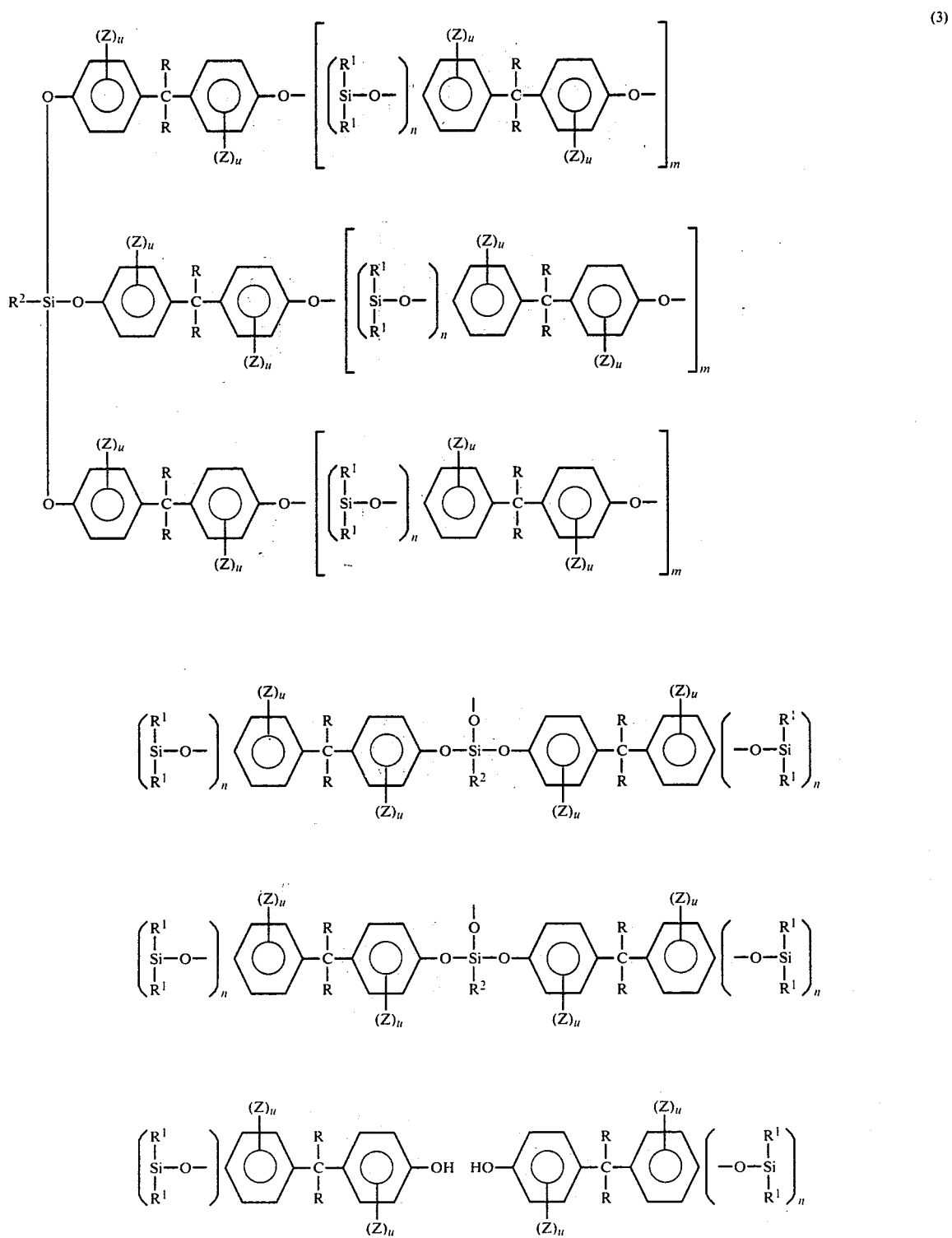

TABLE I-continued
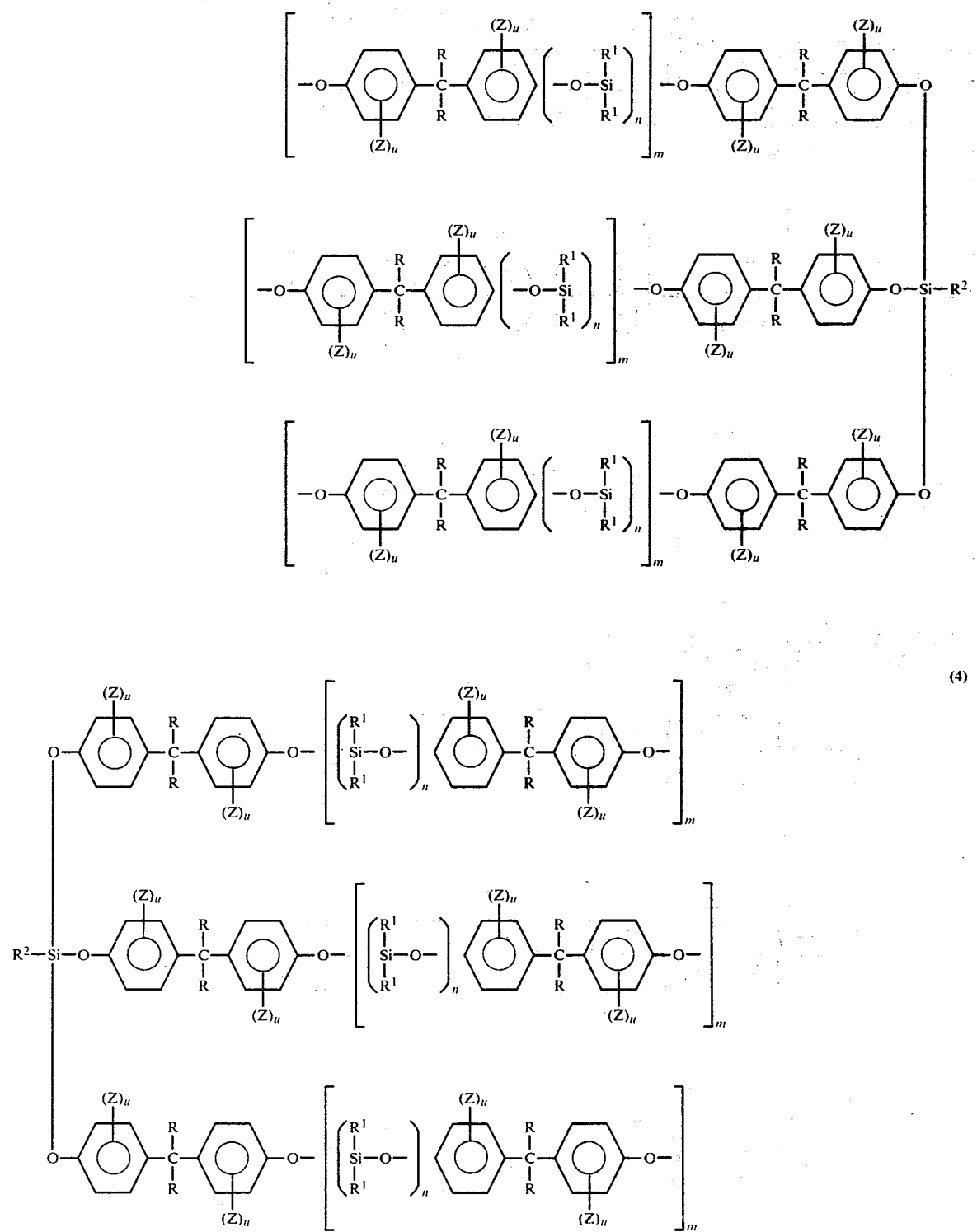

TABLE I-continued

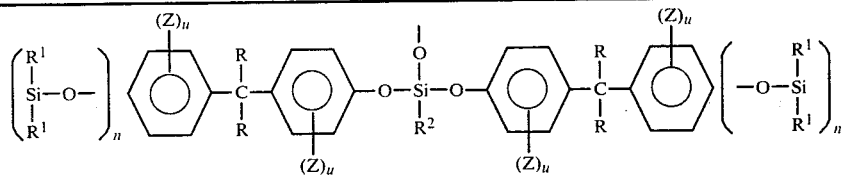

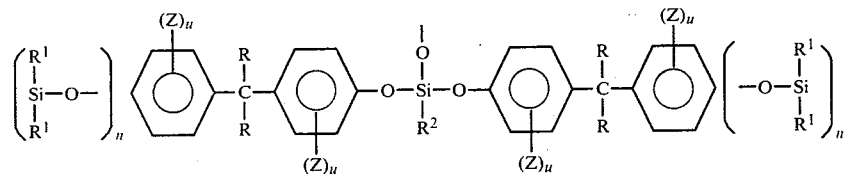

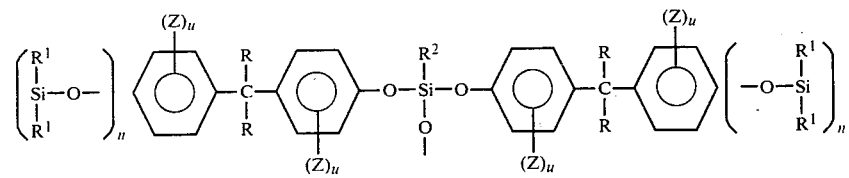

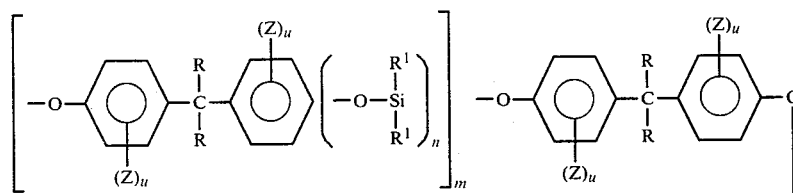

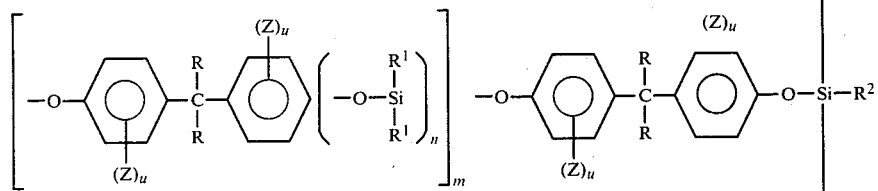

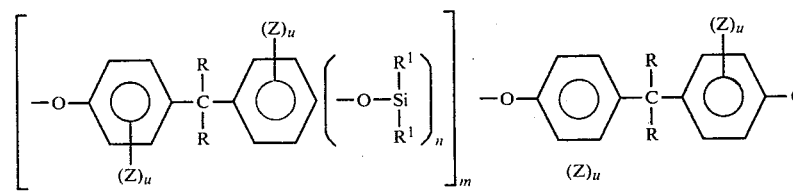

DESCRIPTION OF THE PREFERRED EMBODIMENT

The following examples are set forth to more clearly illustrate the invention. Unless otherwise specified, parts or percentages are by weight.

Example 1

A reaction vessel having a venting part and containing 368 grams of octamethyltetrasiloxane is heated to 50° C. to melt the octamethyltetrasiloxane. After all of the octamethyltetrasiloxane has melted, it is cooled down to room temperature and 71 grams of dimethyldichlorosilane are gradually added with stirring. The resulting mixture is heated to 50° C. and 0.44 grams of $FeCl_3 \cdot 6H_2O$, which has been heated to 50° C. to obtain melting thereof, is added to the heated mixture in the reaction vessel. Heating of this mixture at 50° C. is continued for 10 hours. At the end of 10 hours, the mixture is cooled to room temperature and allowed to stand for 24 hours.

The resulting reaction product has the formula

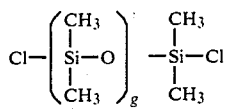

Example 2

This example illustrates the preparation of the halogenated polysiloxane-dihydric phenol reaction product.

To a vessel equipped with gas inlet tube, condenser and stirrer and outlet stopcock, there are charged 456 parts bisphenol-A and 8,000 parts of methylene chloride. With constant stirring, about 40 parts of gaseous ammonia are added through the gas inlet tube extending below the liquid surface until the bisphenol-A dissolves. This procedure takes about 15 minutes. There are then added to the mixture, over a period of about 45 minutes, 1.535 parts of the chlorinated dimethyl-polysiloxane of Example 1, the stirring being continued for about 15 more minutes after which 2,000 parts of water are added. The mixture is then acidified to a pH of about 6 with concentrated HCl, the mixture after standing separating into two layers. The organic layer containing the product is recovered from a bottom outlet in the vessel and further purified. The product is obtained as an 18.4 percent solution in methylene chloride.

Example 3

This example illustrates the preparation of the tris[poly(aryloxysiloxane)] polymer of the instant invention.

Into a flask containing 5cc of hexane are added 1 gram of N,B-(aminoethyl)-γ-aminopropyltrimethoxysilane and 0.2 grams of the halogenated polysiloxane-dihydric phenol reaction product prepared substantially in accordance with Example 2. The mixture is stirred and the hexane is allowed to evaporate. The film which is formed upon evaporation of the hexane is extracted with hexane in order to remove any unreacted species.

The polymers of the present invention can be employed as binding material for parts and laminates, in adhesive formulations, and as coatings for various materials.

While the foregoing examples have of necessity been limited to only a few of the very many variables within the scope of the present invention, it should be understood that the present invention covers a broad class of tris[poly(aryloxysiloxane)] polymers of Formula I which are produced by reacting the trialkoxysilanes of Formula II with the dihydric phenol endblocked polydiorganosiloxane of Formula III.

What is claimed is:

1. A tris[poly(aryloxysiloxane)] polymer represented by the general formula:

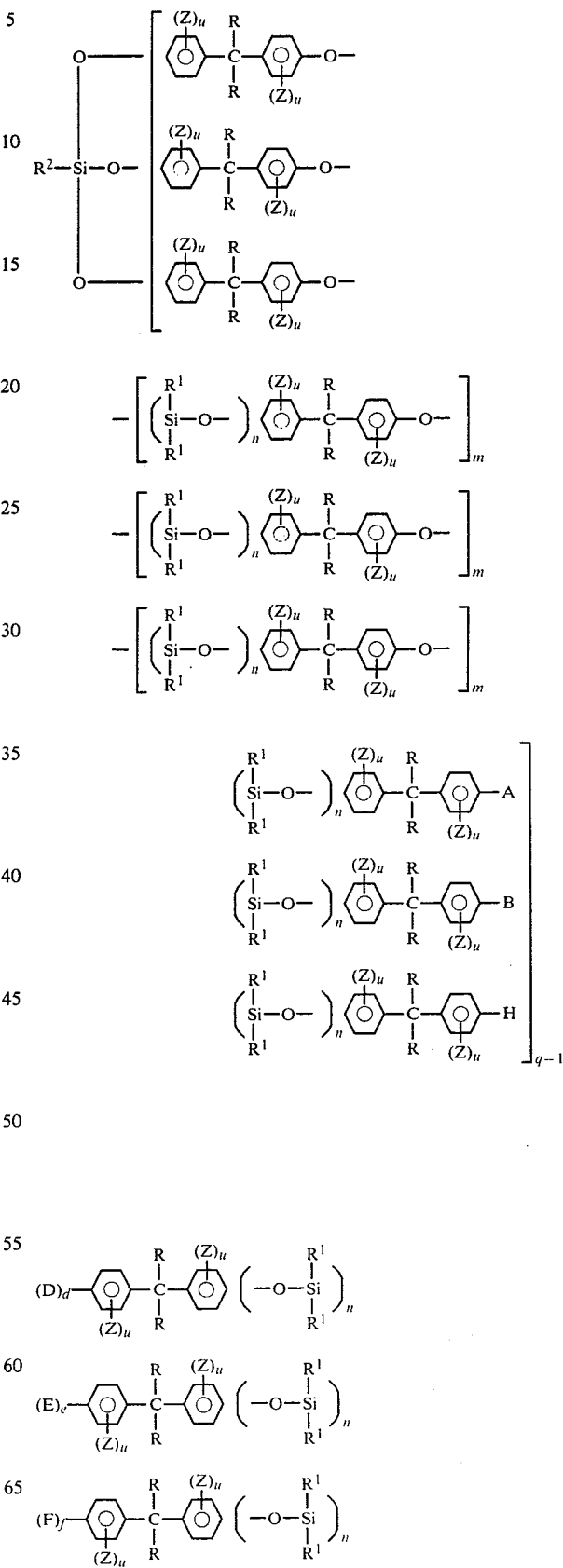

-continued

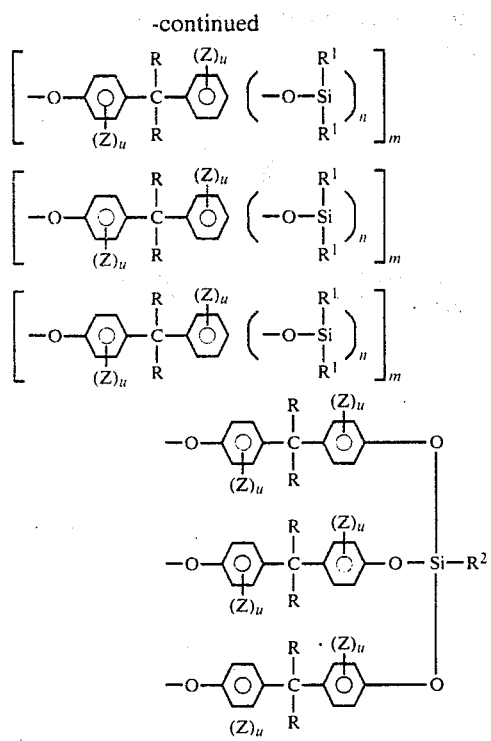

wherein u is an integer equal to from 1 to 4; m has a value from 0 to 10; n is equal to from about 5 to about 500, and preferably n has an average value from about 15 to about 90; q is at least 1, and preferably q is an integer equal to from about 2 to about 500; A, B and H are independently selected from OH and

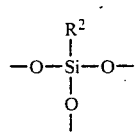

radicals; D, E and F are OH; d, e and f are 0 or 1, provided that if q is equal to 1, then d, e and f are all 0, and further provided that if q is an integer greater than 1, then at least one of A, B and H is

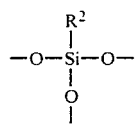

radical and the sum of $d+e+f$ is equal to an integer Y having a value of from 0 to 2 obtained from the formula $3-W=Y$ wherein W is the number of

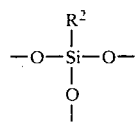

radicals represented by A, B and H; R is a member selected from the class of hydrogen, monovalent hydrocarbon radicals and halogenated monovalent hydrocarbon radicals; $R^1$ is a member selected from the class of monovalent hydrocarbon radicals, halogenated monovalent hydrocarbon radicals, and cyanoalkyl radicals, Z is a member selected from the class of hydrogen, lower alkyl radicals and halogen radicals; and $R^2$ is selected from the class of

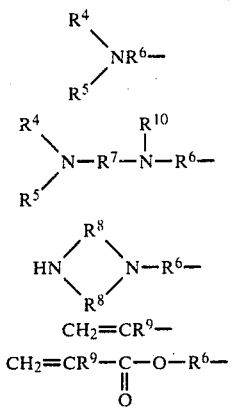

wherein $R^4$, $R^3$ and $R^{10}$ are independently selected from hydrogen and alkyl radicals, preferably alkyl radicals containing from 1 to about 10 carbon atoms, $R^6$ and $R^7$ are alkylidene radicals, $R^8$ is a straight chain alkylidene radical containing from 2 to about 4 carbon atoms, and $R^9$ is a member selected from the class of hydrogen and methyl.

2. The polymer of claim 1 wherein $R^2$ is

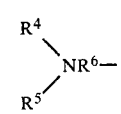

3. The polymer of claim 1 wherein $R^2$ is

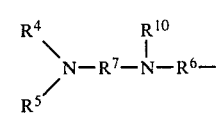

4. The polymer of claim 1 wherein $R^2$ is [N,B-(aminoethyl-γ-aminopropyl] N,beta-(aminoethyl-γ-aminopropyl).

5. The polymer of claim 1 wherein q is 1.

6. The polymer of claim 1 wherein q is an integer having a value of from 2 to about 500.

7. The polymer of claim 1 wherein A, B and H are

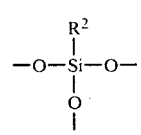

radicals.

8. The polymer of claim 1 wherein two of A, B or H are

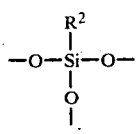
radicals and one of A, B or H is an OH radical.
9. The polymer of claim 1 wherein one of A, B or H is a
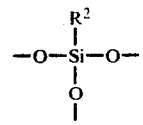
radical and two of A, B or H are OH radicals.
* * * * *

UNITED STATES PATENT AND TRADEMARK OFFICE
CERTIFICATE OF CORRECTION

PATENT NO. : 4,198,498
DATED : April 15, 1980
INVENTOR(S) : Donald G. LeGrand; Gina G. Vitale It is certified that error appears in the above-identified patent and that said Letters Patent are hereby corrected as shown below:

Column 22, Claim 4, lines 50-51, "$[\overline{N},B\text{-(amino-ethyl-}\gamma\text{-aminopropyl}]$" should be deleted.

Signed and Sealed this

Sixth Day of September 1983

[SEAL]

Attest:

GERALD J. MOSSINGHOFF

Attesting Officer

Commissioner of Patents and Trademarks